United States Patent [19]

Aoyama et al.

[11] Patent Number: 4,688,452

[45] Date of Patent: Aug. 25, 1987

[54] HYDRAULIC CONTROL SYSTEM FOR A MOTOR VEHICLE AUTOMATIC TRANSMISSION

[75] Inventors: Mizuki Aoyama; Takuji Fujiwara, both of Hiroshima, Japan

[73] Assignee: Mazda Motor Corporation, Hiroshima, Japan

[21] Appl. No.: 740,561

[22] Filed: Jun. 3, 1985

[30] Foreign Application Priority Data

Jun. 5, 1984 [JP] Japan ................... 59-114782

[51] Int. Cl.[4] ............................................. B60K 41/04
[52] U.S. Cl. ...................................... 74/869; 74/867; 74/870
[58] Field of Search ............... 74/869, 868, 867, 865, 74/870

[56] References Cited

U.S. PATENT DOCUMENTS

| | | | |
|---|---|---|---|
| 3,774,629 | 11/1973 | Enomoto | 74/867 X |
| 3,785,224 | 1/1974 | Will | 74/865 |
| 3,895,542 | 7/1975 | Miyauchi | 74/868 |
| 4,142,613 | 3/1979 | Iijima | 74/866 X |
| 4,369,676 | 1/1983 | Gaus | 74/870 |
| 4,417,307 | 11/1983 | Kubo et al. | 74/866 X |
| 4,467,675 | 8/1984 | Sugano et al. | 74/868 X |

FOREIGN PATENT DOCUMENTS

| | | |
|---|---|---|
| 137650 | 8/1983 | Japan . |
| 2057602 | 4/1981 | United Kingdom . |

Primary Examiner—Leslie Braun
Assistant Examiner—David Novais
Attorney, Agent, or Firm—Fleit, Jacobson, Cohn & Price

[57] ABSTRACT

A vehicle automatic transmission including a torque converter, a multiple stage transmission gear mechanism connected with the torque converter and a hydraulic control circuit for automatically selecting one of gear stages of the transmission gear mechanism. The hydraulic control circuit includes a kick-down control device which functions to shift down the gear mechanism when the engine control foot pedal is substantially fully depressed. Depending on the vehicle running condition, the kick-down control device may shift down the gear mechanism by two gear stages. The hydraulic circuit includes control hydraulic circuit which functions to shift down the gear mechanism at first by one gear stage and then by a further one stage. For the purpose, relay valves are provided in kick-down control lines to lower stage shift valves.

11 Claims, 1 Drawing Figure

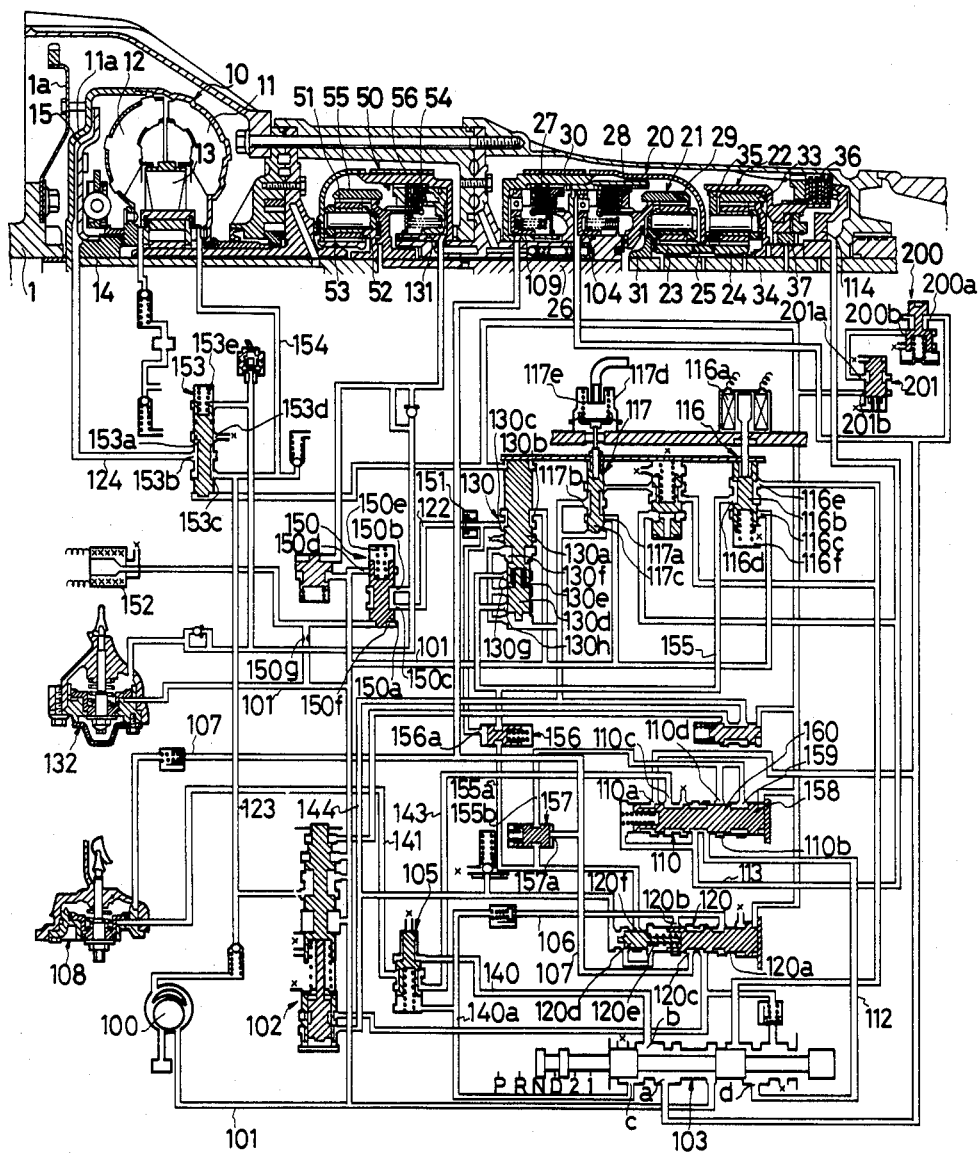

HYDRAULIC CONTROL SYSTEM FOR A MOTOR VEHICLE AUTOMATIC TRANSMISSION

BACKGROUND OF THE INVENTION

1. Field of the Invention

The present invention relates to a motor vehicle automatic transmission and more particularly to a control of a motor vehicle automatic transmission. More specifically, the present invention pertains to a hydraulic control system of an automatic transmission having a multiple-stage transmission gear mechanism having three or more gear stages.

2. Description of Prior Art

Conventional automatic transmissions for motor vehicles include a torque converter and a multiple-stage transmission gear mechanism connected with the torque converter to be driven thereby. The gear mechanism generally has three forward drive stages and one reverse drive stage. In recent automatic transmissions such as the one disclosed by the published U.K. patent application No. 2,057,602, there is arranged an overdrive gear mechanism between the torque converter and the transmission gear mechanism so that an overdrive gear stage is additionally provided. The transmission is provided with a hydraulic control system for selecting an appropriate one of the gear stages in accordance with the vehicle operating conditions, such as the engine output and the vehicle speed. There has also been proposed to provide a multiple stage gear transmission which can provide smooth gear shift operations without having a hydraulic torque converter. This type of transmission may be advantageous in respect of efficiency, over a transmission having a torque convertor.

As one of control modes performed by the control system, there is provided a kick-down control wherein the gear mechanism is shifted down to a lower gear stage when an engine control member such as an engine throttle valve actuating member is moved to a substantially full power position. Where the automatic transmission has such kick-down control mode, and the hydraulic control system is of such type that the gear shift control valves in the control system are operated by hydraulic pressure signals representing the engine operating condition, there is provided a kick-down valve for applying a hydraulic pressure to each gear shift control valve to bias the gear shift valve in a gear shift down sense. More specifically, in a conventional hydraulic control system of the aforementioned type, the shift valve has an axially slidable spool which is applied at one end with a governor pressure representing the vehicle speed in a direction of forcing the spool in the shift up sense and at the other end with a throttle pressure, representing the engine output in a direction of forcing the spool in the shift down sense. The hydraulic pressure from the kick-down valve is applied in the direction of assisting the throttle pressure so that the shift down takes place at a speed higher than the speed under which the shift down normally takes place. An example of such a hydraulic control system is shown, for example, in Japanese patent disclosure No. 58-137650.

The hydraulic control circuit disclosed in the Japanese patent disclosure publication is for the control of four-stage gear transmission mechanism having a three-stage gear mechanism connected with an over-drive gear mechanism so that the circuit has three shift valves, one for the control of the shifting operation between the first and second gear stages, the second for the control between the second and third gear stages and the third for the control between the third and fourth gear stages. In the hydraulic control circuit disclosed by the Japanese patent disclosure publication, the hydraulic pressure from the kick-down valve is applied simultaneously to the three shift valves. It will therefore be understood that there is a possibility that the transmission mechanism be shifted down from the fourth stage directly to the second stage without passing through the third stage, or under some circumstances, it may be shifted down from the fourth stage once to the second stage and then shifted up to the third stage. These operations are undesirable because there will be produced uncomfortable shifting shocks.

OBJECT OF THE INVENTION

It is an object of the present invention to provide a vehicle automatic transmission control system which can prevent shift down shock in two stage shift down under a kick-down control.

Another object of the present invention is to provide a vehicle automatic transmission control system in which gear stages are shifted down stepwisely when two stage shift down is required.

A further object of the present invention is to provide a vehicle automatic transmission including a transmission gear mechanism having a first through third gear stages and an overdrive gear stage, a control system for the gear mechanism having a kick-down control mode in which shift down is carried out from the overdrive gear stage at first to the third gear stage and then to the second gear stage when it is required to shift down from the overdrive gear stage to the second gear stage.

SUMMARY OF THE INVENTION

According to the present invention, the above and other objects can be accomplished by a vehicle automatic transmission including a transmission gear mechanism having at least three gear stages including a low speed stage, a medium stage and a high speed stage for forward drive, a low speed shift valve for controlling shift operations between the low speed and medium stages, a high speed shift valve for controlling shift operations between the medium and high speed stages, kick-down control means comprising a kick-down valve for applying a hydraulic pressure to each of the shift valves to bias the shift valve in a shift down direction, and a relay valve responsive to a change in pressure produced when the high speed shift valve is moved in the shift down direction to connect the kick-down valve to the low speed shift valve.

The present invention can be applied not only to an automatic transmission having a torque converter connected with an input member of a multiple-stage gear transmission mechanism but also to an automatic transmission having no torque converter.

The above and other objects and features of the present invention will become apparent from the following descriptions of a preferred embodiment taking reference to the accompanying drawings.

BRIEF DESCRIPTION OF THE DRAWINGS

The drawing is a sectional view of a vehicle automatic transmission with a hydraulic control circuit embodying the features of the present invention.

DESCRIPTIONS OF THE PREFERRED EMBODIMENT

Basic Structure of the Transmission

Referring to the drawing, there is shown an automatic transmission which comprises a hydraulic torque converter 10, a multiple stage transmission gear mechanism 20, and a planetary gear type over-drive transmission mechanism 50 arranged between the torque converter 10 and the multiple stage transmission gear mechanism 20.

The torque converter 10 has a pump 11 connected

The multiple stage transmission gear mechanism 20 is of known type and can provide three forward driving gear stages and one reverse stage. The planetary gear type over-drive transmission mechanism 50 connects the shafts 14 and 26 directly when the direct connection clutch 54 is engaged and the brake 56 is released, and provides an over-drive connection between the shafts 14 and 26 when the brake 56 is engaged and the clutch 54 is released.

In the Table, there are shown relationships between the gear stages and the operations of the clutches and brakes.

|      | CLUTCH 28 | CLUTCH 27 | CLUTCH 15 | CLUTCH 54 | BRAKE 36 | BRAKE 30 | BRAKE 56 | ONE-WAY CLUTCH 37 |
|------|-----------|-----------|-----------|-----------|----------|----------|----------|-------------------|
| P    |           |           |           | o         |          |          |          |                   |
| R    |           | o         |           | o         | o        |          |          |                   |
| N    |           |           |           | o         |          |          |          |                   |
| 1st  | o         |           |           | o         |          |          |          | o                 |
| 2nd  | o         |           |           | o         |          | o        |          |                   |
| 3rd  | o         | o         |           | o         |          |          |          |                   |
| O.D. | o         | o         | o         |           |          |          | o        |                   | with an output shaft 1 of an engine through a drive plate 1a a converter casing 11a, a turbine 12 provided in the casing 11a to face to the pump 11 and a stator 13 disposed between the pump 11 and the turbine 12. A converter output shaft 14 is connected with the turbine 12. A lock-up clutch 15 is provided between the converter output shaft 14 and the casing 11a which is connected to the pump 11. The lock-up clutch 15 is normally engaged with the casing 11a under a pressure of hydraulic fluid which circulates in the torque converter 10, and is released by a hydraulic pressure, which is drawn to a space between the casing 11a and the clutch 15 from an external pressure source.

The multiple stage transmission gear mechanism 20 has a front planetary gear unit 21 and a rear planetary gear unit 22. The front planetary gear unit 21 has a sun gear 23 connected with a sun gear 24 of the rear planetary gear unit 22 though a connecting rod 25. The gear mechanism 20 has an input shaft 26 connected through a front clutch 27 with the connecting rod 25 and through a rear clutch 28 with an internal gear 29 of the front planetary gear unit 21. A front brake 30 is provided between the connecting rod 25 or the sun gears 23, 24 of the gear units 21 and 22 and a casing of the transmission. The gear mechanism 20 also has an output shaft 34 connected with a planetary carrier 31 of the front planetary gear unit 21 and an internal gear 33 of the rear planetary gear unit 22. The rear planetary gear unit 22 has a planetary carrier 35, and there are provided between the planetary carrier 35 and the transmission casing 30 a rear brake 36 and a one-way clutch 37.

The planetary gear type over-drive transmission mechanism 50 includes planetary gears 51, a planetary carrier 52 rotatably carrying the planetary gears 51 and connected with the output shaft 14 of the torque converter 10, a sun gear 53 engaged with the planetary gears 51, and an internal gear 55 which is also engaged with the planetary gears 51 and connected with the sun gear 53 through a direct connecting clutch 54. An over-drive brake 56 is provided between the sun gear 53 and the transmission casing. The internal gear 55 is connected with the input shaft 26 of the multiple stage transmission gear mechanism 20.

Hydraulic Control Circuit

The above-mentioned automatic transmission is provided with a hydraulic control circuit as shown in the drawing. The hydraulic control circuit has an oil pump 100 which is driven by the engine output shaft 1 through the torque converter 10. Hydraulic oil is discharged under pressure from the pump 100 into a pressure line 101. The oil pressure is reduced by a pressure regulating valve 102 and applied to a select valve 103. The select valve 103 has a plunger which can be selectively positioned in one of shift positions 1, 2, D, N, R and P. When the select valve 103 is positioned in the position D as shown in the drawing, the pressure line 101 is communicated with the ports a, b and c of the select valve 103. In the position 2, the pressure line 101 is communicated with the ports a, b and d of the select valve 103 whereas in the position 1, the line is communicated with the ports a, d and e. In the position R, the line 101 is communicated with the ports d, e and f. The port a is communicated with a hydraulic actuator 104 for the rear clutch 28. It will therefore be understand that when the select valve 103 is positioned in anyone of the positions D, 2 and 1, the actuator 28a makes the rear clutch 28 engage.

The port a is also connected with a 1-2 shift valve 110. The port b is connected through a line 140 with a second lock valve 105 so that the pressure from the port b functions to bias the spool of the valve 105 downward. When the spool of the valve 105 is in the downward position, the line 140 is connected with a line 141 to apply a pressure to an actuator 108 for the front brake 30 at an engaging pressure chamber thereof to thereby make the front brake engage. The port c is connected with the lower end of the second lock valve 105 so that the pressure from the port c biases the spool of the valve 105 upward.

The port c is also connected through a line 106 with a 2-3 shift valve 120 so that the line 106 is connected with a line 107 when the spool of the valve 120 is shifted leftward. The line 107 is connected with the actuator 108 at a releasing pressure chamber so that the pressure applied to the releasing chamber from the line 107 functions to disengage the brake 30 against the pressure in the engaging chamber. The pressure in the line 107 is also directed to an actuator 109 for the front clutch 27 to make the front clutch disengage.

The select valve 103 has a port d which is communicated with a pressure line 101 in either of the 1 and R positions of the valve 103. The port d is connected through a line 112 with the 1-2 shift valve 110. The line 112 is connected, when the spool of the shift valve 110 is in the right position, with an actuator 114 for the rear brake 36 through a line 113.

The hydraulic circuit is further provided with a 3-4 shift valve 130 and an actuator 132 for controlling the operations of the clutch 54 and the brake 56 for the overdrive gear mechanism 50. The actuator 132 has an engaging pressure chamber connected with the pressure line 101 so that the brake 56 is biased to the engaging position under the pressure in the line 101. The 3-4 shift valve 130 has a spool 130a which functions to connect the line 101 with a line 122 when it is in the upward position to allow the hydraulic pressure to flow into the line 122. The pressure in the line 122 is applied through an overdrive release valve 150 to the actuator 132 at a release pressure chamber thereof to thereby release the brake 56. At the same time, the pressure in the line 122 is also applied to the actuator 131 for the clutch 54 to make the clutch 54 engage.

<Signal Producing System>

In order to produce a pressure signal which is proportional to the vehicle speed, there are provided a first governor valve 200 and a second governor valve 201. The first governor valve 200 has an inlet port connected with the port a of the select valve 103 and an output port 200b connected with an inlet port 201a of the second governor valve 201. The second governor valve 201 has an outlet port 201b where a pressure proportional to the vehicle speed is produced.

In order to produce a hydraulic pressure proportional to the engine output, there is provided a vacuum throttle valve 117. The vacuum throttle valve 117 has a valve bore formed with an inlet port 117a and an outlet port 117b and a spool 117c is disposed in the valve bore. The spool 117c is connected at one end with a vacuum actuator 117d which has a spring 117e for biasing the spool 117c to a position where the ports 117a and 117b are connected together. The vacuum actuator 117d is connected with an engine intake suction pressure port (not shown) so that the engine intake suction pressure drawn to the vacuum actuator 117d functions to force the spool 117c to a position wherein the ports 117a and 117b are disconnected from each other. The pressure in the outlet port 117b is applied to the spool 117c at an end opposite to the vacuum actuator 117d. With this arrangement, there is produced at the outlet port 117b of the vacuum throttle valve a pressure proportional to the engine intake suction pressure.

<Shift Valves>

The 1-2 shift valve 110 has a port 110a connected with the port a of the select valve 103. The valve 110 also has a spool 110b and a port 110c which are so arranged that, when the spool 110b is in the leftward position, the port 110a is communicated with the port 110c. The port 110c is connected through the line 143 with the second lock valve 105. As described previously, the line 143 is connected with the line 141 when the spool in the valve 105 is in the upward position.

The 1-2 shift valve 110 is provided at a left hand end of the spool 110b with a spring which functions to force the shift valve 110 toward right. At the right hand end of the spool 110b, there is formed a pressure chamber which is connected with the outlet port 201b of the second governor valve 201. It will therefore be understood that, when the governor pressure from the second governor valve 201 exceeds the force applied by the spring, the spool 110b is shifted leftward against the function of the spring to connect the ports 110a and 110c together to thereby allow the pressure in the line 101 to pass to the line 143.

The 2-3 shift valve 120 has a spool 120a which is slidably disposed in the valve bore formed with ports 120b and 120c, the port 120b being connected with a line 106 from the port c of the select valve 103 and the port 120c being adapted to be connected with the port 120b when the spool 120a is shifted toward left. The port 120c is connected with a line 107 which leads to an actuator 109 for the front clutch 27 and the releasing pressure chamber of the brake actuator 108. At the right hand end of the spool 120a, there is formed a pressure chamber which is connected with the outlet port 201b of the second governor valve 201 so that the governor pressure functions to bias the spool 120a leftward.

The valve bore of the 2-3 shift valve 120 has a small diameter portion at the left hand end where a small diameter spool 120d is disposed. The spool 120d is provided at a right end with a push rod which is in an abutting engagement with the spool 120a. There is a spring 120e between the spools 120a and 120d. The valve bore is formed at the small diameter portion with a port 120f which is connected with a chamber between the spools 120a and 120d when the spool 120d is in the leftwardly shifted position. At the left hand end of the small diameter spool 120d, there is formed a pressure chamber which is connected with a line 144 from the outlet port 117b of the vacuum throttle valve 117. There is further formed a communication passage 120g which connects the pressure chamber with a chamber between the spools 120a and 120d when the spool 120d is in the rightwardly shifted position. It will therefore be understood that the spool 120a is biased leftward by the governor pressure and rightward by the throttle pressure and the spring 120e.

The 3-4 shift valve 130 has the aforementioned spool 130a and a port 130b which is connected with the pressure line 101. There is also formed a port 130c which is adapted to be connected with the port 130b when the spool 130a is in the upwardly shifted position. The port 130c is connected through an orifice check valve 151 with the line 122. At the upper end portion of the spool 130a, there is formed a pressure chamber which is connected with the outlet port 201b of the second governor valve 201 so that the spool 130a is biased downward by the governor pressure. The spool 130a has a large diameter land for controlling the communication between the ports 130b and 130c and a small diameter land formed beneath the large diameter land. Beneath the spool 130a, there is disposed a small diameter spool 130d which is substantially equal in diameter with the small diameter land of the spool 130a. The spool 130d has a push rod which is adapted to be brought into abutting engagement with the spool 130a. A spring 130e is provided between the spools 130a and 130d.

At the lower end of the small diameter spool 130d, there is formed a pressure chamber which is connected with the outlet port 117b of the vacuum throttle valve 117. There is further formed a port 130f which connects the pressure chamber beneath the small diameter spool 130d with a chamber between the large diameter land and the small diameter land of the spool 130a.

<Overdrive Release System>

The overdrive release valve 150 has a spool 150a slidable in a valve bore which is formed with a port 150b leading to an actuator 131 for the overdrive clutch 54 and a releasing pressure chamber of an actuator 132 for the brake 54. The valve bore is further formed with ports 150c and 150d. The port 150c functions to connect the port 150b with the line 122 when the spool 150a is in the downwardly shifted position. The port 150d functions to connect the port 150b with the pressure line 101 when the spool 150a is in the upwardly shifted position. A spring 150e is provided to bias the spool 150a downward. At the lower end portion of the spool 150a, the valve bore is formed with a pressure chamber 150f which is connected through an orifice 150g with the pressure line 101 and through an overdrive release solenoid valve 152 with the drain port. The solenoid valve 152 functions to open the pressure chamber 150f to the drain port when the overdrive switch is turned on.

<Lock Up Control System>

There is provided a lock-up control valve 153 for controlling the torque converter lock up clutch 15. The valve 153 includes a spool 153a slidable in a valve bore which is formed with a port 153b leading through a line 124 to a chamber between the lock up clutch 15 and the pump casing 11a of the torque converter 10. The valve bore is further formed with a port 153c and a drain port 153d. The port 153c functions to connect the port 153b with a lubricant passage 154 from the torque converter 10 when the spool 153a is in the downwardly shifted position. The drain port 153d is connected with the port 153b when the spool 153a is in the upwardly shifted position. At the lower end of the spool 153a, there is formed a pressure chamber which is connected with the outlet port 201b of the second governor valve 201. There is provided a spring 153e which biases the spool 153a downward. It will therefore be understood that, when the vehicle speed exceeds a predetermined valve, the spool 153a is shifted upward against the action of the spring 153e so that or clutch release pressure is drained from the line 124 through the ports 153b and 153d. Thus, the lock up clutch 15 is engaged.

<Kick-Down Circuit>

There is provided for the kick-down control a kick-down solenoid valve 116 which includes a spool 116b adapted to be actuated by a solenoid 116a. The solenoid 116a is energized through a switch which is turned on when an engine control member such as a foot pedal is fully depressed. When the solenoid 116a is energized, the spool 116b is shifted downward. The spool 116b is slidable in a valve bore which is formed with a port 116c connected with a pressure line 101 and ports 116d and 116e. The port 116d is communicated with the port 116c when the spool 116b is downwardly shifted, whereas the port 116e is communicated with the port 116c when the spool 116b is upwardly shifted. The port 116e is connected to the drain port through the select valve 103 when the select valve 103 is in the D position. The solenoid valve 116 is further provided with a spring 116f for biasing the spool 116b upward and the spool 116b is moved downward against the function of the spring 116f when the solenoid 116a is energized to thereby connect the port 116d with the pressure line 101.

The port 116d of the solenoid valve 116 is connected with a line 155 which leads to the 3-4 shift valve 130. The line 155 is connected with a port 130g which is located between the large diameter land and the small diameter land of the spool 130a of the 3-4 shift valve 130 when the spool 130a is in the downward position. The line 155 is also connected with a port 130h which opens to a side of the small diameter spool 130d. The large diameter land of the spool 130a abuts at the downward position of the spool 130a to a shoulder formed in the valve bore so that there is no difference in the area of the pressure acting surface between the large diameter land and the small diameter land in this position of the spool 130a. Therefore, the pressure at the port 130g cannot by itself move the spool 130a upward unless the spool 130a is slightly lifted.

The pressure at the port 130h functions to produce a slight upward movement of the spool 130a. When the small diameter spool 130d is in the downward position, there is a slight leakage along the side surface of the spool 130d of the throttle pressure in the pressure chamber beneath the spool 130d to the port 130h so that the pressure acting on the lower end of the small diameter spool 130d is slightly lower than the throttle pressure. When the line pressure is applied to the port 130h at this situation, the aforementioned leakage is prevented so that there is produced a slight increase in the pressure acting on the lower surface of the small diameter spool 130d. This will cause an upward movement of the small diameter spool 130d and also an upward movement of the spool 130a. Then the pressure at the port 130g functions to move the spool 130a further upward.

When the spool 130a is thus moved upward, the port 130b connected with the pressure line 101 is opened to the port 130c to that the line pressure is introduced into the line 122.

The line 155 from the port 116d of the kick-down solenoid valve 116 is connected with a branch line 155a having a shut-off valve 156. The valve 156 has a pilot port 156a connected with the port 130c of the 3-4 shift valve 130 so that the valve 156 opens the line 155a only when the pressure is produced in the port 130c. The line 155a is connected with a port 120f of the 2-3 shift valve 120 so that, when the spool 120a of the shift valve 120 is in the leftward position, the pressure applied to the port 120f increases the rightward biasing force on the spool 120a.

The line 155a is connected with a branch line 155b which is provided with a shut-off valve 157. The valve 157 has a pilot port 157a connected with a line 107 from the port 120c of the 2-3 shift valve 120 so that the valve 157 closes the line 155b when a pressure is applied to the pilot port 157a but opens the line when the pressure at the port 157a is relieved. The line 155b is connected with the 1-2 shift valve 110. The spool 110b of the valve 110 has a right land 158 and a land 160 spaced apart from the land 158 through an annular groove 159. The line 155b is connected with a port 110d which opens to the annular groove 159 when the spool 110a is in the left position. The land 158 is slightly larger in diameter than the land 160 so that the pressure at the port 110d produces a rightward biasing force.

OPERATIONS

<1st Stage>

When the select valve 103 is in the D-position, the pressure line 101 is opened to the port c so that the line pressure is applied to the lower end of the spool of the second lock valve 105 whereby the spool of the valve 105 is upwardly shifted. Further, the line pressure from the line 101 is directed through the port a of the select valve 103 to the port 110a of the 1-2 shift valve 110. The line pressure is also directed from the port a to the clutch 28 to engage the same. Where the vehicle speed is low as in the case of a vehicle start, the governor pressure is low that the spool 110b of the 1-2 shift valve 110 is in the rightward position. In this position, the port 110a is closed so that no pressure is produced in the port 110c. The spool 120a of the 2-3 shift valve 120 is also in the rightward position so that the port 120c is disconnected from the port 120b. Therefore, no pressure is produced in the port 120c. It will therefore be understood that the actuator 108 for the brake 30 is in the brake release position and the clutch 27 is also disengaged. The spool 130a of the 3-4 shift valve 130 is in the upward position so that the port 130b connected with the line 101 is in communication with the port 130c which is leading to the line 122.

When the overdrive switch is turned on, the solenoid valve 152 is opened to drain the pressure chamber 150f of the overdrive release valve 150 so that the spool 150a of the valve 150 is held in the downward position. Thus, the ports 150b and 150c of the valve 150 are communicated with each other so that the pressure in the line 122 is transmitted on one hand to the clutch 54 to engage the same and on the other hand to the release pressure chamber of the actuator for the brake 56 to release the same. The spool 153a of the lock up control valve 153 is also in the downward position so that the lock up clutch 15 of the torque converter 10 is released. Therefore, the 1st stage drive is obtained.

<2nd Stage>

As the vehicle speed increases, the governor pressure is correspondingly increased and, when the governor pressure increases beyond a predetermined value, the spool 110b of the 1-2 shift valve 110 is moved leftward. The port 110c is therefore connected with the port 110a so that the pressure is directed from the port 110c through the line 143, the second lock valve 105 and the line 141 to the engaging pressure chamber of the actuator 108 for the brake 30. Thus, the brake 30 is engaged and the 2nd stage drive is obtained.

<3rd Stage>

As the vehicle speed further increases to a valve where the balance of the throttle pressure and the governor pressure is such that the shift up to the 3rd stage shall be made, the spool 120a of the 2-3 shift valve 120 is moved leftward so that the port 120b is connected with the port 120c. Since the port 120c is applied with the line pressure from the port c of the select valve 103 through the line 106, the line pressure is directed through the line 107 to the release pressure chamber of the actuator 108 for the brake 30 to release the brake 30. At the same time, the pressure from the port 120c is applied to the actuator 109 for the clutch 27 to engage the same. Thus, the third stage drive is obtained.

<4th Stage (Overdrive) and Lock Up>

As the vehicle speed further increases to a valve which is suitable for the 4th stage, the spool 130a for the 3-4 shift valve 130 is moved downward. Therefore, the port 130b connected with the pressure line 101 is disconnected from the port 130c which is now opened to the drain port. Thus, the pressure in the line 122 is decreased to thereby release the clutch 54 and make the actuator 132 to operate to engage the brake 56. Thus, the 4th stage drive is obtained.

When the vehicle speed increases further beyond a predetermined value, the spool 153a of the lock up control valve 153 is moved upward under the function of the governor pressure, whereby the line 124 from the lock up clutch 15 of the torque converter 10 is opened through the port 153b to the drawn port 153d. Therefore, the torque converter 10 is locked up.

When the overdrive switch is turned on, the solenoid valve 152 is closed so that the pressure chamber 150f of the overdrive release valve 150 is applied with the line pressure from the line 101. Thus, the spool 150a of the valve 150 is moved upward to connect the pressure line 101 through the port 150d to the port 150b. It will therefore be understood that the 4th stage drive is not obtained even when the spool 130a of the 3-4 shift valve 130 is moved downward.

<Kick-Down>

When the engine control member such as the foot pedal is fully depressed and the kick-down switch is actuated, the solenoid 116a of the solenoid valve 116 is energized and the spool 116b is moved downward. The port 116c leading from the pressure line 101 is then opened to the port 116d to introduce the line pressure to the line 155. The line pressure is therefore applied to the ports 130g and 130h of the 3-4 shift valve 130. The pressure at the port 130h functions to produce a slight upward movement of the spools 130a and 130d to make the pressure at the port 130g move the spool 130a further upward. Thus, the port 130b is opened to the port 130c to direct the line pressure from the port 130b through the port 130c to the line 122 to accomplish the 3rd stage drive.

The pressure in the port 130c is applied to the pilot port 156a of the shut-off valve 156 to open the same. Thus, the pressure in the line 155 is directed through the line 155a to the port 120f of the 2-3 shift valve 120. When the spools 120a and 120d of the shift valve 120 are in the leftward positions, the port 120f is opened to the chamber between the spools 120a and 120d. Therefore, the pressure at the port 120f functions to increase the rightward biasing force on the spool 120a. It will thus be understood that the shift down to the 2nd stage is produced at a higher vehicle speed.

When the spool 120a of the 2-3 shift valve 120 is in the rightward position, the pressure in the port 120c is decreased so that the pressure in the line 107 is also low. Therefore, the valve 157 in the line 155b is opened. The line pressure is then directed to the port 110d of the 1-2 shift valve 110 so that the rightward biasing force on the spool 110b is increased. It will therefore be understood that the spool 110b is shifted rightward under a relatively high vehicle speed to shift down to the first stage.

With the arrangement described above, when it is desired to shift down from the 4th or 3rd stage by two or three stages, the shift down is carried out step by step. Therefore, it is possible to avoid an uncomfortable shift shocks.

The invention has thus been shown and described with reference to a specific embodiment, however, it should be noted that the invention is in no way limited to the details of the illustrated arrangements but changes and modifications may be made without departing from the scope of the appended claims.

We claim:

1. A vehicle automatic transmission including a transmission gear mechanism having at least three gear stages including a low speed stage, a medium speed stage and a high speed stage for forward drive, a low speed shift valve for controlling shift operations between the low speed and medium speed stages, a high speed shift valve for controlling shift operations between the medium speed and high speed stages, kick-down control means comprising a kick-down valve for applying a hydraulic pressure to each of the shift valves to bias the shift valves in a shift down direction, and a shut-off valve located in a line between said kick-down valve and said low speed shift valve and being responsive to a pressure produced when the high speed shift valve has been moved in the shift down direction to open said line between said kick-down valve and said low speed shift valve to thereby connect the kick-down valve to the low speed shift valve.

2. A vehicle automatic transmission in accordance with claim 1 in which said shut-off valve is of a spool type having a spool and a pilot port at one end of said spool.

3. A vehicle automatic transmission in accordance with claim 3 which includes means for connecting the pilot port with a port in the high speed shift valve wherein a pressure change is produced when the high speed shift valve is moved in the shift down direction.

4. A vehicle automatic transmission in accordance with claim 2 which includes means for connecting the pilot port with a port in the high speed shift valve wherein a drain pressure is produced when the high speed shift valve is moved in the shift down direction.

5. A vehicle automatic transmission in accordance with claim 1 in which each of said shift valves includes a valve member which is biased in one direction by a pressure corresponding to a vehicle speed and in the opposite direction by a biasing force.

6. A vehicle automatic transmission in accordance with claim 5 which includes for applying the hydraulic pressure from the kick-down valve in a direction of assisting the biasing force.

7. A vehicle automatic transmission in accordance with claim 5 in which said biasing force is a pressure corresponding to an engine load.

8. A vehicle automatic transmission including a transmission gear mechanism having four gear stages including a 1st, 2nd, 3rd and 4th gear stages for forward drive, a 1-2 shift valve for controlling shift operations between the 1st and 2nd gear stages, a 2-3 shift valve for controlling shift operations between the 2nd and 3rd gear stages, a 3-4 shift valve for controlling shift operations between the 3rd and 4th gear stages, kick-down valve means producing a kick-down pressure, a first kick-down line connecting the kick-down valve means with the 3-4 shift valve for applying the kick-down pressure in a direction of biasing the 3-4 shift valve in a shift down direction, a second kick-down line connecting the kick-down valve means with the 2-3 shift valve for applying the kick-down pressure in a direction of biasing the 2-3 shift valve in a shift down direction, a first shut-off valve provided in the second kick-down line, said first shut-off valve is responsive to a pressure change produced at a port of the 3-4 shift valve when the 3-4 shift valve is moved in the shift down direction for opening the second kick-down line.

9. A vehicle automatic transmission in accordance with claim 8 which further includes a third kick-down line connecting the kick-down valve means with the 1-2 shift valve for applying the kick-down pressure in a direction of biasing the 1-2 shift valve in a shift down direction, and a second shut-off valve provided in the third kick-down line, said second shut-off valve is responsive to a pressure change produced at a port of the 2-3 shift valve when the 2-3 shift valve is moved in the shift down direction for opening the third kick-down line.

10. A vehicle automatic transmission including a transmission gear mechanism having at least three gear stages including a low speed stage, a medium speed stage and a high speed stage for forward drive, a low speed shift valve for controlling shift operations between the low speed and medium speed stages, a high speed shift valve for controlling shift operations between the medium speed and high speed stages, kick-down control means comprising a kick-down valve for applying a hydraulic pressure to each of the shift valves to bias the shift valves in a shift down direction, and a pilot-type shut-off valve located in a line between said kick-down valve and said low speed shift valve, said shut-off valve including a spool and a pilot port at one end of said spool, means for connecting said pilot port with a port in said high speed shift valve wherein a pressure change is produced when the high speed shift valve has been moved in the shift down direction to open said line between said kick-down valve and said low speed shift valve by moving said spool under said pressure change to thereby connect said kick-down valve to said low speed shift valve.

11. A vehicle automatic transmission including a transmission gear mechanism having four gear stages including a 1st, 2nd, 3rd and 4th gear stages for forward drive, a 1-2 shift-valve for controlling shift operations between the 1st and 2nd gear stages, a 2-3 shift valve for controlling shift operations between the 2nd and 3rd gear stages, a 3-4 shift valve for controlling shift operations between the 3rd and 4th gear stages, kick-down valve means producing a kick-down pressure, a first kick-down line connecting the kick-down valve means with the 3-4 shift valve for applying kick-down pressure in a direction of biasing the 3-4 shift valve in a shift down direction, a second kick-down line connecting the kick-down valve means with the 2-3 shift valve for applying the kick-down pressure in a direction of biasing the 2-3 shift valve in a shift down direction, a first pilot type shut-off valve provided in the second kick-down line and having a first spool and a first pilot port at one end of said first spool, first means for connecting the first pilot port with a port in the 3-4 shift valve wherein a pressure change is produced when the 3-4 shift valve is moved in the shift down direction for opening the second kick-down line by moving the first spool under the pressure change to thereby connect the kick down valve means with the 2-3 shift valve to move the 2-3 shift valve in the shift down direction.

* * * * *